US011819828B2

(12) United States Patent
Andersen et al.

(10) Patent No.: US 11,819,828 B2
(45) Date of Patent: Nov. 21, 2023

(54) MULTI-FUNCTION CATALYST ARTICLE FOR TREATING BOTH CO AND NOX IN STATIONARY EMISSION SOURCE EXHAUST GAS

(71) Applicants: Johnson Matthey Public Limited Company, London (GB); Johnson Matthey Catalysts (Germany) GmbH, Redwitz an der Rodach (DE)

(72) Inventors: Paul Joseph Andersen, Audubon, PA (US); Ferdinand Baer, Redwitz an der Rodach (DE); Maria Theresia Brandmair, Redwitz an der Rodach (DE); Kevin Doura, Audubon, PA (US); Heike Kreuder, Redwitz an der Rodach (DE); Desiree Duran Martin, Reading (GB)

( * ) Notice: Subject to any disclaimer, the term of this patent is extended or adjusted under 35 U.S.C. 154(b) by 60 days.

(21) Appl. No.: 16/948,587

(22) Filed: Sep. 24, 2020

(65) Prior Publication Data

US 2021/0094022 A1 Apr. 1, 2021

Related U.S. Application Data

(60) Provisional application No. 62/907,076, filed on Sep. 27, 2019.

(51) Int. Cl.
| | | |
|---|---|---|
| *B01J 23/847* | (2006.01) | |
| *B01J 23/44* | (2006.01) | |
| *B01J 23/02* | (2006.01) | |
| *B01J 23/10* | (2006.01) | |
| *B01J 23/34* | (2006.01) | |
| *B01J 23/00* | (2006.01) | |
| *B01J 21/04* | (2006.01) | |
| *B01J 35/04* | (2006.01) | |
| *B01D 53/94* | (2006.01) | |
| *B01J 29/70* | (2006.01) | |
| *B01J 37/00* | (2006.01) | |
| *B01J 37/02* | (2006.01) | |

(52) U.S. Cl.
CPC ...... *B01J 23/8472* (2013.01); *B01D 53/9459* (2013.01); *B01J 21/04* (2013.01); *B01J 23/002* (2013.01); *B01J 23/02* (2013.01); *B01J 23/10* (2013.01); *B01J 23/34* (2013.01); *B01J 23/44* (2013.01); *B01J 29/7015* (2013.01); *B01J 35/04* (2013.01); *B01D 2257/404* (2013.01); *B01D 2257/502* (2013.01); *B01J 37/0009* (2013.01); *B01J 37/0201* (2013.01)

(58) Field of Classification Search
CPC ...... B01J 23/8472; B01J 23/002; B01J 23/02; B01J 23/10; B01J 23/34; B01J 23/44; B01J 21/04; B01J 29/7015; B01J 35/04; B01D 53/9459
See application file for complete search history.

(56) References Cited

U.S. PATENT DOCUMENTS

| | | | | |
|---|---|---|---|---|
| 4,624,940 | A * | 11/1986 | Wan | B01J 37/0248 502/262 |
| 6,087,298 | A * | 7/2000 | Sung | F01N 3/2803 502/328 |
| 7,727,499 | B2 | 6/2010 | Xinsheng et al. | |
| 10,252,252 | B2 * | 4/2019 | Bauer | B01J 23/40 |
| 2004/0224840 | A1 * | 11/2004 | Kim | B01J 23/683 502/309 |
| 2007/0110643 | A1 | 5/2007 | Sobolevskiy et al. | |
| 2015/0071841 | A1 | 3/2015 | Brandmair | |
| 2015/0375207 | A1 | 12/2015 | Francesco et al. | |
| 2016/0245139 | A1 | 8/2016 | Repp | |

FOREIGN PATENT DOCUMENTS

| | | |
|---|---|---|
| CN | 109999631 A | 7/2019 |
| GB | 1403555 A | 8/1975 |
| GB | 2533452 A | 9/2015 |
| GB | 2574097 A | 5/2019 |
| JP | S62163732 A | 7/1987 |
| WO | 2014027207 A1 | 2/2014 |
| WO | 2017055857 A1 | 4/2017 |
| WO | 2019186121 A1 | 10/2019 |

OTHER PUBLICATIONS

Li et al., Catalysis Today, (2011), v175, p. 147-156.*

* cited by examiner

Primary Examiner — Yong L Chu

(57) ABSTRACT

A multi-function catalyst article for treating both NO and carbon monoxide emissions in a flow of a combustion exhaust gas from a stationary emission source comprises a honeycomb monolith substrate comprising one or more channels which are open at both ends and extend along an axial length thereof and through which, in use, a combustion exhaust gas flows, which catalyst article comprising a catalyst composition comprising a combination of a first, vanadium-containing SCR catalyst component and a second component which is a compound of a transition metal comprising copper, manganese, cobalt, molybdenum, nickel or cerium or a mixture of any two or more thereof and optionally a third, crystalline molecular sieve component.

14 Claims, No Drawings

MULTI-FUNCTION CATALYST ARTICLE FOR TREATING BOTH CO AND NOX IN STATIONARY EMISSION SOURCE EXHAUST GAS

CROSS-REFERENCE TO RELATED APPLICATION

This application claims priority to U.S. provisional application 62/907,076, filed Sep. 27, 2019.

FIELD OF THE INVENTION

The present invention relates to a multi-function catalyst article for treating both $NO_x$ and carbon monoxide emissions in a flow of a combustion exhaust gas from a stationary emission source. The invention also relates to a catalyst composition for making such multi-function catalyst article, methods of making such multi-function catalyst article, an exhaust system comprising the multi-function catalyst article, a stationary source, such as a power station, comprising the exhaust system according to the invention and a method for treating an exhaust gas comprising $NO_x$ and carbon monoxide using the multi-function catalyst article.

BACKGROUND TO THE INVENTION

Modern electric power generators fuelled by natural gas, light distillates or syngases (derived e.g. from coal) operate combined cycle gas turbines, in which the gas is combusted in a gas turbine to generate electricity in a first cycle and heat generated from combustion of the gas is recovered in a steam-operated heat engine in a second cycle. The combination of these two cycles increases the net overall efficiency of the system. The second cycle is typically conducted in what is known as a Heat Recovery Steam Generator (HRSG) system, which typically also includes catalytic components for treating components including oxides of nitrogen ($NO_x$), carbon monoxide (CO) and unburned hydrocarbons (HC) in the exhaust gas resulting from the combustion of the gas in the first cycle. Catalytic activity of these catalytic components is promoted by transfer of the heat of the exhaust gas being treated to the catalytic components themselves. Location of the catalytic components within the HRSG system can be selected for temperature-optimised catalytic activity.

Emission of NOx from stationary sources, primarily from power stations, industrial heaters, cogeneration plants including wood-fired boilers, stationary diesel and gas engines, marine propulsion engines, diesel locomotive engines, industrial and municipal waste incinerators, chemical plants and glass, steel and cement manufacturing plants represents a major environmental problem. NOx leads to the formation of ozone in the troposphere, the production of acid rain and respiratory problems in humans. NOx is formed thermally in the combustion process by combination of the $N_2$ and $O_2$ present in the air. At temperatures greater than about 1,500° C., this reaction proceeds at appreciable rates through a well-characterised mechanism called the Zeldovich mechanism.

In order to meet NOx emissions standards specified by various regulatory agencies, methods of after-treatment of exhaust (flue) gases are required. Among such after-treatment methods, the selective catalytic reduction (SCR) method is the best developed and most used world-wide for the control of $NO_x$ emissions from stationary sources due to its efficiency, selectivity (to $N_2$ product) and economics. The SCR reaction generally consists of the reduction of $NO_x$ by ammonia ($NH_3$) to form water and nitrogen.

The major reactions involved in SCR $NO_x$ reduction are shown in reactions (1), (2) and (3):

$$4NO+4NH_3+O_2 \rightarrow 4N_2+6H_2O \quad (1)$$

$$6NO_2+8NH_3 \rightarrow 7N_2+12H_2O \quad (2)$$

$$NO+NO_2+2NH_3 \rightarrow 2N_2+3H_2O \quad (3)$$

Three types of catalysts that promote reactions (1)-(3) inclusive have been developed: noble metals, metal oxides and metal promoted zeolites. Noble metal SCR catalysts are primarily considered for low temperature and natural gas applications, because they can undesirably promote $SO_2$ oxidation at above about 200° C.

Among the various metal oxide SCR catalysts developed for 300-400° C. applications, vanadia supported on titania in the anatase form and promoted with tungsta or molybdena was found to resist sulfation and to have low activity for the $SO_2$ oxidation reaction.

Commercial zeolite SCR catalysts for the treatment of stationary source $NO_x$ emissions include mordenite (see R. H. Heck et al, "Catalytic Air Pollution Control—Commercial Technology", $3^{rd}$ Edition (2009) John Wiley & Sons, Inc. Hoboken, New Jersey). See in particular Chapter 12.

Fe-promoted zeolite catalysts have been proposed for SCR primarily for use in gas-fired cogeneration plants at high temperatures, i.e. up to 600° C., where metal oxide catalysts can be thermally unstable.

The commercial SCR catalysts are deployed in the form of extruded honeycomb monoliths, plates or as coatings on inert honeycomb monoliths.

For a more complete description of the background to the application of the SCR method to stationary sources of $NO_x$ emission, please see P. Forzatti, App. Cat A: General 222 (2001) 221-236.

Reaction (3) is known to be a relatively fast reaction compared to either reaction (1) or in particular reaction (2), and so is preferred. A suitable oxidation catalyst disposed upstream of the SCR catalyst for this purpose is also relevant for treating CO and HC components in the exhaust gas. Reductant injection upstream of the SCR catalyst is generally done downstream of the oxidation catalyst to avoid inefficient consumption of ammonia (by oxidation to NOx), with consequent reduction of overall system conversion performance. Ammonia injection can be done via a suitable apparatus, such as an ammonia injection grid (AIG).

Although any of the above SCR catalysts can be used to treat NOx in a HRSG system, gas combustion exhaust gas temperatures generally require that the above-mentioned metal oxide or metal promoted zeolites are appropriate.

Gas turbine emission control systems generally include a separate CO oxidation catalyst (CO-Ox) followed by an ammonia injection grid (AIG) and finally an SCR catalyst bed (SCR). US patent application publication no. 2016/0245139 A1 discloses an exhaust system for a power generating apparatus comprising a heat source for combusting a fuel in air to produce power, which exhaust system being adapted to receive a flowing exhaust gas and comprising a catalyst system for treating the exhaust gas, which catalyst system comprising a first oxidation catalyst and a second catalyst, wherein the first oxidation catalyst is positioned downstream from the heat source so that the flowing exhaust gas contacts the first oxidation catalyst before the second catalyst.

More recently, there have been proposals to combine the CO oxidation function and the $NO_x$ reduction function in a single catalyst substrate. For example, Applicant's WO 2017/055857 discloses a catalytic article for treating an exhaust gas stream containing one or more of NOx, hydrocarbons, CO, SOx and ammonia from a combustion turbine comprising (a) a substrate having an inlet end and an outlet end defining an axial length; (b) an oxidation layer comprising an oxidation catalyst comprising one or more noble metals, the oxidation layer being positioned on the substrate and covering the axial length of the substrate; and (c) an SCR layer comprising an SCR catalyst, the SCR layer being positioned on the oxidation layer and overlapping a portion of the oxidation layer, wherein the portion is less than 100%.

US patent application publication no. 2007/0110643 A1 discloses an exhaust gas treatment apparatus for reducing the concentration of NOx, HC and CO in an exhaust gas stream such as produced by a gas turbine engine of a power generating station. The treatment apparatus includes a multifunction catalytic element having an upstream reducing-only portion and a downstream reducing-plus-oxidizing portion that is located downstream of an ammonia injection apparatus. The selective catalytic reduction (SCR) of NOx is promoted in the upstream portion of the catalytic element by the injection of ammonia in excess of the stoichiometric concentration, with the resulting ammonia slip being oxidized in the downstream portion of the catalytic element. Any additional NOx generated by the oxidation of the ammonia is further reduced in the downstream portion before being passed to the atmosphere.

US patent publication no. 7727499 discloses a method for removal by oxidation of the excess ammonia ($NH_3$) gas ("ammonia slip") resulting from flue and exhaust gases that have been subjected to selective catalytic reduction (SCR) for reduction of nitrogen oxides (NOx) with ammonia. More specifically, the method uses an ammonia oxidation catalyst consisting of a zeolite, one or more precious metals, and a base metal compound, to catalyze the oxidation of both ammonia and carbon monoxide (CO), while minimizing the formation of nitrogen oxides (NOx).

US 2015/0375207 discloses a catalyst for simultaneous oxidation of carbon monoxide and volatile organic compounds and selective reduction of nitrogen oxides in flue or exhaust gas by reaction with ammonia, the catalyst comprises a first layer of an oxidation catalyst consisting of palladium, vanadium oxide and titanium oxide and a second layer of an $NH_3$-SCR catalyst comprising oxides of tungsten, molybdenum, vanadium and titanium completely supporting the first layer.

Applicant's WO 2014/027207 discloses a catalyst composition for treating exhaust gas comprising a blend of a first component and second component, wherein the first component is an aluminosilicate or ferrosilicate molecular sieve component wherein the molecular sieve is either in $H^+$ form or is ion exchanged with one or more transition metals, and the second component is a vanadium oxide supported on a metal oxide support selected from alumina, titania, zirconia, ceria, silica, and combinations thereof. In one embodiment, an SCR catalyst and an ammonia slip catalyst (ASC) are used in series, wherein both catalysts comprise the catalyst blend and wherein the SCR catalyst is upstream of the ASC catalyst. The ASC catalyst can be disposed as a top layer on an oxidative under-layer, wherein the under-layer comprises a PGM catalyst or a non-PGM catalyst. The front part of a substrate can be coated with just SCR coating and the rear coated with SCR and ASC catalyst which can further include Pt or Pt/Pd on an alumina support.

Applicant's International patent application PCT/GB2019/050825 filed 22 Mar. 2019 and claiming priority to UK patent application no. 1805312.4 filed 29 Mar. 2018 discloses a catalyst article for treating a flow of a combustion exhaust gas having a catalytically active substrate comprising one or more channels extending along an axial length thereof through which, in use, a combustion exhaust gas flows, the one or more channels having a first surface for contacting a flow of combustion exhaust gas; wherein the substrate is formed of an extruded vanadium-containing SCR catalyst material, wherein a first layer is disposed on at least a portion of the first surface, wherein the first layer comprises a washcoat of an ammonia slip catalyst composition comprising one or more platinum group metals supported on a particulate metal oxide support material, and wherein a layer comprising a washcoat of SCR catalyst composition is disposed on a surface in the one or more channels, wherein at least the portion of the first surface on which the first layer is disposed comprises a compound of copper, iron, cerium or zirconium or a mixture of any two or more thereof.

The cost of platinum group metals and other precious metals is significant to the overall cost in general of a catalyst formulation, particularly for those in the field of stationary emission control, such as gas turbine power stations. Furthermore, a platinum component of a catalyst formulation for treating exhaust gas from stationary emission sources can promote oxidation of $SO_2$ to $SO_3$, which combines with water (steam) in the atmosphere to generate sulfuric acid, thus contributing to environmental impacts, including so-called "acid rain". Moreover, palladium is prone to catalyst poisoning by sulfation. It would be highly desirable, therefore to be able to remove altogether precious metals including platinum group metals from exhaust gas aftertreatment catalyst formulations for use in treating exhaust gas from stationary emission sources, particularly those for use with gas turbine power stations, while achieving similar levels of NOx and ammonia slip control, thus also reducing or avoiding the ancillary issues of precious metal use mentioned hereinabove.

SUMMARY OF THE INVENTION

The inventors have now discovered that, very surprisingly, by adding certain base metal components to the formulation of a known vanadium-containing SCR catalyst material, the resulting catalyst formulation has dual-functionality for carbon monoxide oxidation activity and $NH_3$-SCR $NO_x$ reduction activity without the need for any costly precious or platinum group metal. However, by combining the catalyst formulation with a palladium component as the sole precious metal in the formulation, carbon monoxide oxidation can be improved and $NO_x$ conversion maintained compared with the use of other precious metals, particularly platinum. The resulting catalysts (whether precious metal free or containing palladium) can be more compact than prior art systems, which require separate substrates to promote each of $NH_3$-SCR and ammonia-slip activity, and so less costly (lower catalyst volume and reduced packaging costs). Furthermore, the substrates can have lower backpressure, when in use, because there is no need to coat an additional layer of precious metal including platinum group metal-containing washcoat on the substrate to promote ammonia slip catalyst functionality and/or fewer substrates in an exhaust treatment system can have lower backpressure. One or more of these benefits additional to the removal of precious/platinum group metals is highly desirable.

According to a first aspect, the invention provides a multi-function catalyst article for treating both $NO_x$ and carbon monoxide emissions in a flow of a combustion exhaust gas from a stationary emission source, the article comprising a honeycomb monolith substrate comprising one or more channels which are open at both ends and extend along an axial length thereof and through which, in use, a combustion exhaust gas flows, which catalyst article comprising a catalyst composition comprising a combination of a first, vanadium-containing SCR catalyst component and a second component which is a compound of a transition metal comprising copper, manganese, cobalt, molybdenum, nickel or cerium or a mixture of any two or more thereof and optionally a third, crystalline molecular sieve component According to a second aspect, the invention provides a catalyst composition which is a catalytic washcoat or paste comprising a mixture of a first, vanadium-containing SCR catalyst component and a second component which is a compound of a transition metal comprising copper, manganese, cobalt, molybdenum, nickel or cerium or a mixture of any two or more thereof and one or more fillers, binders, processing aids, water and dopants and optionally a third, crystalline molecular sieve component.

According to a third aspect, the invention provides a method of making a honeycomb monolith substrate comprising a catalyst composition for use as a multi-function catalyst article for treating both $NO_x$ and carbon monoxide emissions in a flow of a combustion exhaust gas from a stationary emission source, which method comprising preparing a catalytic washcoat or paste according to the second aspect, coating the catalytic washcoat or paste onto an inert honeycomb monolith substrate and drying and calcining the resulting coated inert honeycomb monolith substrate.

According to a fourth aspect, the invention provides a method of making a honeycomb monolith substrate comprising a catalyst composition for use as a multi-function catalyst article for treating both $NO_x$ and carbon monoxide emissions in a flow of a combustion exhaust gas from a stationary emission source, which method comprising preparing a catalytic washcoat or paste comprising a mixture of a first, vanadium-containing SCR catalyst component and optionally a third, crystalline molecular sieve component and one or more fillers, binders, processing aids, water and dopants, coating the catalytic washcoat or paste onto an inert honeycomb monolith substrate and drying and calcining the resulting coated inert honeycomb monolith, impregnating channel walls of the calcined coated inert honeycomb monolith substrate with an aqueous salt of a compound of a transition metal selected from the group consisting of a transition metal comprising copper, manganese, cobalt, molybdenum, nickel or cerium or a mixture of any two or more thereof and drying and calcining the impregnated coated inert honeycomb monolith substrate.

According to a fifth aspect, the invention provides a catalyst composition which is an extrudable mass comprising a mixture of water, a first, vanadium-containing SCR catalyst component and a second component which is a compound of a transition metal comprising copper, manganese, cobalt, molybdenum, nickel or cerium or a mixture of any two or more thereof and optionally a third, crystalline molecular sieve component and one or more binder component, which is a clay, alumina and/or glass fibres.

According to a sixth aspect, the invention provides a method of making a honeycomb monolith substrate comprising an extruded catalyst composition for use as a multi-function catalyst article for treating both $NO_x$ and carbon monoxide emissions in a flow of a combustion exhaust gas from a stationary emission source, which method comprising preparing an extrudeable mass according to the sixth aspect of the invention, extruding the extrudeable mass through a suitable die to form a wet honeycomb shaped object comprising an array of longitudinally extending channels and drying and calcining the resulting extruded wet honeycomb shaped object.

According to an seventh aspect, the invention provides a method of making a honeycomb monolith substrate comprising an extruded catalyst composition for use as a multi-function catalyst article for treating both $NO_x$ and carbon monoxide emissions in a flow of a combustion exhaust gas from a stationary emission source, which method comprising preparing an extrudeable mass comprising a catalyst composition comprising a mixture of water, a first, vanadium-containing SCR catalyst component and optionally a third, crystalline molecular sieve component and one or more binder component, which is a clay, alumina and/or glass fibres, extruding the extrudeable mass through a suitable die to form a wet honeycomb shaped object comprising an array of longitudinally extending channels, drying and calcining the resulting extruded wet honeycomb shaped object, impregnating channel walls of the calcined honeycomb monolith substrate with an aqueous salt of a compound of a transition metal comprising copper, manganese, cobalt, molybdenum, nickel or cerium or a mixture of any two or more thereof and drying and calcining the impregnated extruded honeycomb monolith substrate.

According to an eighth aspect, the invention provides an exhaust system for selectively catalysing the reduction of oxides of nitrogen ($NO_x$) including nitrogen monoxide and carbon monoxide in an exhaust gas of a stationary source of combined $NO_x$ and CO emissions, which system comprising an injector for introducing a nitrogenous reductant into the exhaust gas located downstream from the oxidation catalyst; and a catalyst article according to the first aspect of the invention located downstream of the injector.

According to a ninth aspect, the invention provides a stationary source of $NO_x$ and carbon monoxide emissions, which is a power station, an industrial heater, a cogeneration power plant, a combined cycle power generation plant, a wood-fired boiler, a stationary diesel engine, a stationary natural gas-fired engine, a marine propulsion engine, a diesel locomotive engine, an industrial waste incinerator, a municipal waste incinerator, a chemical plant, a glass manufacturing plant, a steel manufacturing plant or a cement manufacturing plant comprising an exhaust system according to the eighth aspect of the invention.

According to a tenth aspect, the invention provides a method for treating an exhaust gas comprising $NO_x$, which optionally comprises a ratio of NO to $NO_2$ from about 4:1 to about 1:3 by volume, and carbon monoxide, which method comprising the steps of:

(i) contacting an exhaust gas stream containing $NO_x$ and $NH_3$ with a catalyst article according to the first aspect of the invention; and (ii) converting at least a portion of the $NO_x$ to $N_2$ and/or converting at least a portion of the CO to $CO_2$.

DETAILED DESCRIPTION OF THE INVENTION

The present disclosure will now be described further. In the following passages different aspects/embodiments of the disclosure are defined in more detail. Each aspect/embodiment so defined may be combined with any other aspect/ embodiment or aspects/embodiments unless clearly indicated to the contrary. In particular, any feature indicated as being preferred or advantageous may be combined with any other feature or features indicated as being preferred or advantageous. It is intended that the features disclosed in relation to the product may be combined with those disclosed in relation to the method and vice versa.

Furthermore, the term "comprising" as used herein can be exchanged for the definitions "consisting essentially of" or "consisting of". The term "comprising" is intended to mean that the named elements are essential, but other elements may be added and still form a construct within the scope of the claim. The term "consisting essentially of" limits the scope of a claim to the specified materials or steps and those that do not materially affect the basic and novel characteristic(s) of the claimed invention. The term "consisting of" closes the claim to the inclusion of materials other than those recited except for impurities ordinarily associated therewith.

The invention provides a multi-function catalyst article for treating both $NO_x$ and carbon monoxide emissions in a flow of a combustion exhaust gas from a stationary emission source, the article comprising a honeycomb monolith substrate comprising one or more channels which are open at both ends and extend along an axial length thereof and through which, in use, a combustion exhaust gas flows, which catalyst article comprising a catalyst composition comprising a combination of a first, vanadium-containing SCR catalyst component and a second component which is a compound of a transition metal comprising copper, manganese, cobalt, molybdenum, nickel or cerium or a mixture of any two or more thereof and optionally a third, crystalline molecular sieve component.

That is, the basic and novel characteristics of the invention consist essentially of a catalyst article comprising a catalyst composition which—aside from fillers, binders etc which substantially do not contribute to catalyst activity—is a combination of two catalytic components: a first, vanadium-containing SCR catalyst component and a second component which is a compound of a transition metal comprising copper, manganese, cobalt, molybdenum, nickel or cerium or a mixture of any two or more thereof.

There are a number of ways in which the second component can be combined with the first component. In one method, the first component can be physically mixed or blended with particles comprising the second component. This physical mixture can be in the form of a washcoat for coating onto an inert substrate monolith; a paste for pressing into a perforated metal gauze for use in a metal plate-type honeycomb monolith substrate; or as an extrudeable mass for extruding into a honeycomb monolith substrate form.

In a second method, the first component is washcoated onto an inert substrate monolith; or a paste comprising the first component is pressed into a perforated metal gauze for use in a metal plate-type honeycomb monolith substrate; or a composition comprising the first component is extruded into a honeycomb monolith substrate form; and then the second component is combined with the first component by impregnating the washcoat, paste or extrudate comprising the first component with an aqueous solution of a compound of the second component.

Such methods are defined according to the third, fourth, sixth and seventh aspects of the present invention.

Catalyst compositions for use in connection with the third aspect of the invention are defined according to the second aspect of the invention; and catalyst compositions for use in connection with the fifth aspect of the invention are defined according to the fourth aspect of the invention.

Furthermore, the multi-function catalyst article can be precious metal free, i.e. it does not comprise any precious metals; or palladium as the sole precious metal can be combined with at least the first component either by impregnating the washcoat, paste or extrudate with palladium; or by including palladium which has been pre-fixed onto a refractory metal oxide support material in the washcoat, paste or extrudeable mass mixture itself.

The above features are defined in various specific modes of the methods according to the invention, as follows:

The method according to the third aspect can be further specified as including the step of impregnating the coated catalyst composition on the inert honeycomb monolith substrate with an aqueous salt of a palladium compound and drying and calcining the resulting impregnated coated honeycomb monolith substrate.

The method according to the fourth aspect can be further specified as including the step of including palladium as an only precious metal present in the catalyst composition, which has been pre-fixed onto a refractory metal oxide support material; or by impregnating the coated catalyst composition on the inert honeycomb monolith substrate with an aqueous salt of a palladium compound and drying and calcining the impregnated coated inert honeycomb monolith substrate, wherein the aqueous salt of the palladium compound is present in a mixture with the aqueous salt of a compound of a transition metal selected from the group consisting of a transition metal comprising copper, manganese, cobalt, molybdenum, nickel or cerium or a mixture of any two or more thereof; or the step of impregnating channel walls of a calcined coated inert honeycomb monolith substrate with an aqueous salt of a palladium compound and drying and calcining the impregnated coated inert honeycomb monolith substrate is performed either before or after the step of impregnating channel walls of the calcined coated inert honeycomb monolith substrate with an aqueous salt of a compound of a transition metal selected from the group consisting of a transition metal comprising copper, manganese, cobalt, molybdenum, nickel or cerium or a mixture of any two or more thereof and drying and calcining the impregnated coated inert honeycomb monolith substrate.

In the method according to the fourth aspect including the impregnation step, the inert honeycomb monolith substrate coated with the catalytic washcoat has an axial length L, wherein the step of impregnating channel walls with any one or more of (i) only the aqueous salt of a compound of a transition metal selected from the group consisting of a transition metal comprising copper, manganese, cobalt, molybdenum, nickel or cerium or a mixture of any two or more thereof; (ii) the mixture of aqueous salts of a compound of a transition metal selected from the group consisting of a transition metal comprising copper, manganese, cobalt, molybdenum, nickel or cerium or a mixture of any two or more thereof and the aqueous salt of a palladium compound; or (iii) only the aqueous salt of a palladium compound, can comprise impregnating less than the axial length L of the coated inert honeycomb monolith substrate, optionally ≤0.5 L.

In methods wherein an inert honeycomb monolith substrate is coated with a paste, the inert honeycomb monolith substrate is preferably a metal plate-type substrate comprising layers of perforated metal gauze.

The method of the sixth aspect of the invention can be further specified by the step of impregnating channel walls of the calcined extruded honeycomb monolith substrate with an aqueous salt of a palladium compound and drying and calcining the impregnated extruded honeycomb monolith substrate.

The method according to the seventh aspect can be further specified as including the step of including palladium as an only precious metal present in the catalyst composition, which has been pre-fixed onto a refractory metal oxide support material; or by including the step of impregnating the honeycomb monolith substrate comprising the extruded catalyst composition with an aqueous salt of a palladium compound and drying and calcining the impregnated honeycomb monolith substrate, wherein the aqueous salt of the palladium compound is present in a mixture with the aqueous salt of a compound of a transition metal selected from the group consisting of a transition metal comprising copper, manganese, cobalt, molybdenum, nickel or cerium or a mixture of any two or more thereof; or the step of impregnating channel walls of the calcined honeycomb monolith substrate with an aqueous salt of a palladium compound and drying and calcining the impregnated calcined honeycomb monolith substrate is performed either before or after the step of impregnating channel walls of the calcined honeycomb monolith substrate with an aqueous salt of a compound of a transition metal selected from the group consisting of a transition metal comprising copper, manganese, cobalt, molybdenum, nickel or cerium or a mixture of any two or more thereof and drying and calcining the impregnated honeycomb monolith substrate.

In the method according to the seventh aspect including the impregnation step, the honeycomb monolith substrate comprising the extruded catalyst composition has an axial length L, wherein the step of impregnating channel walls with any one or more of (i) only the aqueous salt of a compound of a transition metal selected from the group consisting of a transition metal comprising copper, manganese, cobalt, molybdenum, nickel or cerium or a mixture of any two or more thereof; (ii) the mixture of aqueous salts of a compound of a transition metal selected from the group consisting of a transition metal comprising copper, manganese, cobalt, molybdenum, nickel or cerium or a mixture of any two or more thereof and the aqueous salt of a palladium compound; or (iii) only the aqueous salt of a palladium compound can comprise impregnating less than the axial length L of the honeycomb monolith substrate, optionally ≤0.5 L.

For some applications, the honeycomb flow-through monolith preferably has a high cell density, for example about 600 to 800 cells per square inch, and/or an average internal wall thickness of about 0.18-0.35 mm, preferably about 0.20-0.25 mm. For certain other applications, the honeycomb flow-through monolith preferably has a low cell density of about 150-600 cells per square inch, more preferably about 200-400 cells per square inch. Preferably, the honeycomb monoliths are porous.

Aspects of the multi-function catalyst article according to the first aspect of the invention can be defined as follows:

In one embodiment, the multi-function catalyst does not comprise any precious metals.

In a preferred embodiment, the catalyst composition comprises palladium as an only precious metal present in the multi-function catalyst article. In one arrangement the catalyst composition is impregnated with the palladium. In another arrangement, the palladium is pre-fixed onto a refractory metal oxide support material and combined with at least the first component.

In the embodiment comprising the palladium, the palladium loading can be about 0.5 to about 350 gft$^{-3}$. A palladium loading of about 3 to about 20 gft$^{-3}$ is preferred for use with stationary sources which are power plants, e.g. cogeneration plants including gas turbines. Palladium loadings at about 20<about 350 gft$^{-3}$ are useful for Compressed Natural Gas (CNG) engine applications.

Preferably, the second component comprises copper, manganese, cobalt, cerium or a mixture of any two or more thereof. In this regard, Applicant has found that including a ceria-zirconia mixed oxide (CeZrOx) in the washcoat, paste or extrudeable mass mixtures and then impregnating the resulting composition with copper and manganese has provided beneficial results. In a particular embodiment, the second component is a mixed oxide comprising manganese, magnesium, aluminium and lanthanum (MnMgAlLaOx), which is included in the mixture of the washcoat, paste or extrudeable mass.

Methods of making the first, vanadium-containing SCR catalyst component are known. Preferably, the first, vanadium-containing SCR catalyst component comprises a vanadium oxide—often quoted as $V_2O_5$—supported on a metal oxide support, which is titania, silica-stabilized titania or a mixture of titania and silica-stabilized titania. Where present, the titania is preferably anatase because it has a higher surface area. The silica-titania mixed oxide, where present, may be characterised by a silica to titania balance. Preferably, the silica-titania mixed oxide contains less than 50 wt % silica, preferably from 5 to 25 wt % and more preferably from 7 to 15 wt % silica.

Most preferably, the metal oxide support of the first, vanadium-containing SCR catalyst component comprises tungsten oxide as this improves the stability of the vanadium oxide and improves overall catalyst activity.

The vanadium oxide of the first, vanadium-containing SCR catalyst component can be provided in the form of an iron vanadate.

The vanadium present in the catalyst composition of the final product can comprise 0.5 to 5.0 weight percent vanadium calculated as $V_2O_5$, preferably 1.0 to 3.0 wt. %, based on the total weight of the catalyst composition as a whole.

The multi-function catalyst according to the present invention extends to embodiments including the first and second components only, i.e. the catalyst composition does not comprise a crystalline molecular sieve. Examples of extruded vanadium-containing substrates are provided in WO 2011/092521, WO 2009/093071 and WO 2013/017873. However, in an alternative component, the catalyst composition comprises the third, crystalline molecular sieve component, which is optionally ion-exchanged with the transition metal iron, copper, nickel, cobalt or zinc or a combination of any two or more thereof. Details of catalyst compositions comprising the first and third components can be found in Applicant's WO 2014/027207.

The third, crystalline molecular sieve can be a ferrosilicate molecular sieve (also known as an amorphous iron molecular sieve); or a non-zeolite molecular sieve (silicoaluminophophate). The crystalline molecular sieve can be promoted with a transition metal or it can be present as in the H$^+$ form. The crystalline molecular sieve can also have the MFI, BEA or FER framework type or be any isotype thereof. However, in order to further distinguish Applicant's WO 2014/027207, any one or more of the features in this paragraph can be disclaimed from the definitions of any one or more of the first to tenth aspects according to the invention.

Preferably, where present, the third, crystalline molecular sieve for use in the present invention is an aluminosilicate zeolite. A zeolite is a microporous aluminosilicate having any one of the framework structures listed in the Database of Zeolite Structures published by the International Zeolite Association (LZA). Preferred framework structures for use in the present invention include, but are not limited to those of the CHA, FAU, BEA, MFI, MOR types. Non-limiting examples of zeolites having these structures include chabazite, faujasite, zeolite Y, ultrastable zeolite Y, beta zeolite, mordenite, silicalite, zeolite X, and ZSM-5. Zeolites can be categorised by pore size, e.g. a maximum number of tetrahedral atoms present in a zeolite's framework. As defined herein, a small pore zeolite, such as CHA, contains a maximum ring size of eight tetrahedral atoms, whereas a medium pore zeolite, e.g. MFI, contains a maximum ring size of ten tetrahedral atoms and a large pore zeolite, such as BEA, contains a maximum ring size of twelve tetrahedral atoms. Meso pore zeolites are also known, but they have a maximum ring size of greater than twelve tetrahedral atoms. Most preferred zeolite frameworks for the SCR catalyst compositions for use in layers of the present invention are the small pore zeolites, particularly those having the framework type AEI, AFX, CHA, DDR, ERI, ITE, LEV, LTA, STI or SFW, or which CHA or AEI are particularly preferred.

Aluminosilicate zeolites can have a silica/alumina molar ratio (SAR) defined as $SiO_2/Al_2O_3$) from at least about 5, preferably at least about 20, with useful ranges of from about 10 to 200. Most preferably, the aluminosilicate SAR range is 10 to 30, which provides a balance between activity, i.e. the ability to ion-exchange to anionic sites provided by alumina, and thermal durability provided by the silica content.

It will be appreciated that the transition metals of the second component overlap with the transition metals disclosed for ion-exchange in the zeolites of the compositions disclosed in WO 2014/027207. Therefore, to distinguish the compositions disclosed in WO 2014/027207, either (i) all transition metals present in second component can different from the transition metal ion-exchanged in the third, crystalline molecular sieve component; or (ii) one or more transition metal in the second component is the same as the metal ion-exchanged in the third, crystalline molecular sieve component, and the quantity of the metal present in the catalyst composition is in excess of the ion-exchange capacity of the third, crystalline molecular sieve component. In this regard, the quantity of the metal present in the catalyst composition according to the first aspect of the invention can be in excess of the ion-exchange capacity of the third, crystalline molecular sieve component can be at least twice the ion-exchange capacity of the third, crystalline molecular sieve component, such as at least three time (×3), at least ×4, at least ×5, at least ×6, at least ×7, at least ×8, at least ×9 or at least ×10 that of the ion-exchange capacity of the third, crystalline molecular sieve component.

Where present, a weight ratio of the first, vanadium-containing SCR catalyst component to the third, crystalline molecular sieve component in the catalyst composition can be 95:5 to 60:40.

The multi-function catalyst according to the invention can take a number of forms. In one arrangement, the honeycomb monolith substrate is inert, e.g. it is made of a ceramic such as cordierite, and the channels are defined at least in part by surfaces of the honeycomb monolith substrate channel walls and wherein the catalyst composition is disposed on the channel walls of the honeycomb monolith substrate as a washcoat. Alternatively, the honeycomb monolith substrate is an inert metal plate-type substrate comprising layers of perforated metal gauze and the catalyst composition is pressed into the gauze as a paste-consistency.

Alternatively, the catalyst composition is extruded as a honeycomb monolith substrate. In this case, the catalyst composition typically comprises one or more binder component, which is a clay, alumina and/or glass fibres.

In the exhaust system according to the eighth aspect of the invention, the exhaust system according can comprise a heat recovery steam generator (HRSG).

The nitrogenous reductant for use in the exhaust system according to the eighth aspect of the present invention can be ammonia per se, hydrazine or an ammonia precursor selected from the group consisting of urea (($NH_2)_2CO$), ammonium carbonate, ammonium carbamate, ammonium hydrogen carbonate and ammonium formate. Ammonia is most preferred.

The stationary source according to the ninth aspect of the invention can be a cogeneration plant, preferably a stationary natural gas-fired engine, wherein the exhaust system comprises a heat recovery steam generator (HRSG).

According to the method of the tenth aspect of the invention, the $kNO_x$ of the honeycomb substrate monolith or the plate-type substrate comprising the catalyst can be less than or equal to about 300 m/hr.

Preferably, the kNOx of the honeycomb substrate monolith or the plate-type substrate comprising the catalyst is about 90<kNOx<about 300 m/h between about 300 and about 400° C.

The catalyst for converting ammonia in exhaust gas also containing oxygen to nitrogen and water preferably converts about 70% $NH_3$ at above 250° C., more preferably >about 80% $NH_3$ at above about 300° C.

The catalyst for converting ammonia in exhaust gas also containing oxygen to nitrogen and water preferably has an sNOx=NOx out divided by ($NH_3$ in minus $NH_3$ out)<about 20% below about 400° C., more preferably an sNOx<about 10% below about 350° C., wherein the sNOx is determined using the same conditions defined for determining $kNO_x$ hereinabove.

The space velocity at which the exhaust gas contacts the catalyst for converting ammonia in exhaust gas also containing oxygen to nitrogen and water can be from 50,000 to 500,000 $h^{-1}$, such as 100,000 to 400,000 $h^{-1}$ or 150,000 $h^{-1}$ to 350,000 $h^{-1}$.

Definitions

As defined herein "precious metals" include the platinum group metals, i.e. platinum, palladium, rhodium, ruthenium, osmium and iridium; and the metal elements silver and gold.

SCR Catalyst NOx Activity can be defined by the $kNO_x$ of a catalyst. The term "k-value" is used to express the SCR catalyst activity. In order to determine the "k-value", catalyst samples are tested in a laboratory reactor where the $NO_x$ conversion rate is measured under defined conditions, intended to match the actual flue gas conditions of the unit.

To describe the catalyst deactivation trend versus time, the term "$k_t/k_0$" or relative catalyst activity is used. The value $k_t/k_0$ provides a measure of the relative activity remaining in the catalysts at the sampling time (e g—a $k_t/k_0$ value of 0.90 means that 90% of the original catalyst activity remains at the time of sampling). $k_t$ is the activity value at a given time after flue gas exposure, $k_0$ is the activity of the fresh catalyst.

The following calculations are used in the determination of $NO_x$ activity in the test reactor.

$NO_x$ conversion equation:

$$\eta_{NOx} = \frac{c_0^{(NOx)} - c^{(NOx)}}{c_0^{(NOx)}} * 100\%$$

where:

$\eta_{NOx}$ is the $NO_x$ conversion through the catalyst sample—in %

$c_0(NO_x)$ is the $NO_x$ concentration at the inlet of the test reactor—in ppmvd $c(NO_x)$ is the $NO_x$ concentration at the outlet of the test reactor—in ppmvd ppmvd is parts per million, volume based, dry gas $NO_x$ activity constant equation:

$$k(NOx) = -AV * \ln\left(1 - \frac{\eta_{NOx}}{100\%}\right)$$

where:

$k(NO_x)$ is the $NO_x$ activity constant for the catalyst sample—in m/h

AV is the area velocity through the catalyst sample—in m/h $$AV = \frac{\text{Exhaust Gas Flow Rate}[m^3/h]}{\text{Exposed Outer Catalyst Surface Area}[m^2]}$$

Oxidation Catalyst Light-Off is the measure of CO conversion through the oxidation catalyst vs temperature. The light-off performance is determined in a laboratory-scale reactor by flowing synthetic exhaust gas through a catalyst sample and measuring CO conversion while ramping the gas temperature from low to high. CO conversion at a given temperature is calculated per the following equation:

$$\text{CO Conversion} = \frac{[CO]_{in} - [CO]_{out}}{[CO]_{in}} \times 100\%$$

where $[CO]_{in}$ is the CO concentration at the sample inlet and $[CO]_{out}$ is the CO concentration at the sample outlet.

The present disclosure will now be further described with reference to the following non-limiting Examples.

EXAMPLES

Example 1: Preparation of Base Extruded Honeycomb Substrate

An extruded honeycomb substrate catalyst according to WO 2014/027207 A1 was prepared by firstly mixing a MFI aluminosilicate zeolite that has been ion-exchanged with >1 wt. % iron with 2 wt. % $V_2O_5$—$WO_3/TiO_2$ balance components with inorganic auxiliaries including glass fibres to improve rheology for extrusion and increase mechanical strength of the extrudate. Suitable organic auxiliaries such as extrusion lubricants and plasticisers can be added to facilitate mixing to form an homogeneous extrudable mass. The organic auxiliaries may include cellulose, water soluble resins such as polyethylene glycol and are burnt out from the final substrate during calcination. The appropriate proportions of the zeolite, $V_2O_5$—$WO_3/TiO_2$, inorganic auxiliaries were selected so that—following removal of the organic auxiliaries—the substrate comprised 16 wt. % of the Fe/zeolite component, 72 wt. % of the $V_2O_5$— $WO_3/TiO_2$ component, 12 wt. % of the inorganic auxiliaries. The extrudable mass was extruded to form a 1-inch diameter×70 mm long cylindrical honeycomb body in the flow-through configuration (i.e. cells open at both ends) having a cell density of 400 cells per square inch and having honeycomb cell wall thicknesses of 11 thousandths of an inch (mil). The extruded honeycomb substrates so formed were then dried and calcined to form the finished product.

Example 2: Impregnation of Substrate Samples

Following an analysis of the water uptake of the porous extruded honeycomb substrate prepared according to Example 1, the whole of an extruded honeycomb substrate prepared according to Example 1 was dipped in an aqueous solution of copper acetate at a concentration calculated from the water uptake step to achieve a copper loading of 1.2 wt %. This sample was labelled "Example 2A".

Separately, a second extruded honeycomb substrate prepared according to Example 1 was dipped in an aqueous solution of copper acetate and manganese acetate at concentrations calculated from the water uptake step to achieve a copper loading of 4.4 wt % and a manganese loading of 4.4 wt %. This sample was labelled "Example 2B".

Separately, a third extruded honeycomb substrate prepared according to Example 1 was dipped in an aqueous solution of copper acetate, manganese acetate and $CeZrO_4$ at concentrations calculated from the water uptake step to achieve a copper loading of 1.2 wt % and a manganese loading of 0.1 wt % and a Ce—Zr loading of 10 wt %. This sample was labelled "Example 2C".

The resulting impregnated parts were dried and calcined. The resulting products are defined as being "fresh" catalysts, i.e. freshly prepared, un-aged.

Example 3: Sample Testing

The samples prepared according to Example 2 were each loaded into a synthetic catalytic activity test (SCAT) laboratory apparatus to test each sample's ability to reduce NOx and to oxidise carbon monoxide. The test gas mixture used was 50 ppm CO, 24 ppm NO, 6 ppm $NO_2$, 30 pm $NH_3$, 15% $O_2$, 8% water, 3% $CO_2$, and balanced by $N_2$ at a flow rate such that the Gas Hourly Space Velocity (GHSV) was 75,000 $hr^{-1}$. CO, NOx, and $NH_3$ conversions were measured with the reactor held at steady state temperature points. The results are set out in the following Tables. A catalyst prepared according to Example 1 was tested as a control.

| | Example 1 | |
|---|---|---|
| Inlet T | SCR Conversion (%) | |
| (° C.) | NOx | CO |
| 200 | 46.3 | 0 |
| 250 | 51.8 | 0 |
| 300 | 57.8 | 0 |
| 350 | 59.7 | 0 |
| 400 | 57.3 | 0 |
| 450 | 48.0 | 0 |

Example 2A

| Inlet T | SCR + 1.2% CuOx Conversion (%) | |
|---|---|---|
| (° C.) | NOx | CO |
| 200 | 37.1 | 1.1 |
| 250 | 50.7 | 2.2 |
| 300 | 58.9 | 5.7 |
| 350 | 59.0 | 13.4 |
| 400 | 49.7 | 26.5 |
| 450 | 22.6 | 40.4 |

Example 2B

| Inlet T | SCR + 4.4% CuOx + 4.4% MnOx Conversion (%) | |
|---|---|---|
| (° C.) | NOx | CO |
| 250 | 48.3 | 7.1 |
| 300 | 54.2 | 14.1 |
| 350 | 55.1 | 26.7 |
| 400 | 47.9 | 40.4 |

Example 2C

| Inlet T | SCR + 1.2% CuOx + 0.1% MnOx + 10% Ce—Zr Conversion (%) | |
|---|---|---|
| (° C.) | NOx | CO |
| 200 | 44.9 | 0.5 |
| 250 | 52.2 | 0.7 |
| 300 | 59.4 | 3.1 |
| 350 | 61.6 | 6.4 |
| 400 | 59.0 | 13.2 |
| 450 | 52.3 | 23.3 |

Example 4: Preparation of Extruded Honeycomb Substrate Containing MnOx

Using the recipe of Example 1 as a base, three further samples were prepared each having different proportions of the base 72 wt. % of the $V_2O_5$—$WO_3$/$TiO_2$ component removed and exchanged for commercially available manganese oxide. In a first sample (Example 4A) 10 wt % of the $V_2O_5$—$WO_3$/$TiO_2$ component was removed and replaced with the MnOx component. In a second sample (Example 4B), 15 wt % was replaced by MnOx; and in a third sample (Example 4C) 20 wt % was replaced by MnOx. It will be appreciated that by removing some of the $V_2O_5$—$WO_3$/$TiO_2$ component, the weight ratio of the first, vanadium-containing SCR catalyst component to the third, crystalline molecular sieve component in the catalyst composition decreased. The resulting samples were dried and calcined.

Example 5: Sample Testing

The samples prepared according to Example 4 were tested in the same way as Example 3 and the results are set out in the following Tables. The results of the control (Example 1) are those in the Table reported in Example 3 hereinabove.

Example 4A

| Inlet T | SCR + 10% MnOx Conversion (%) | |
|---|---|---|
| (° C.) | NOx | CO |
| 200 | 57.3 | 1.2 |
| 250 | 55.3 | 0.7 |
| 300 | 63.6 | 1.7 |
| 350 | 66.5 | 4.6 |
| 400 | 66.4 | 7.7 |

Example 4B

| Inlet T | SCR + 15% MnOx Conversion (%) | |
|---|---|---|
| (° C.) | NOx | CO |
| 200 | 47.0 | 0.5 |
| 250 | 61.7 | 1.4 |
| 300 | 68.2 | 3.6 |
| 350 | 67.9 | 7.8 |
| 400 | 66.2 | 12.7 |

Example 4C

| Inlet T | SCR + 20% MnOx Conversion (%) | |
|---|---|---|
| (° C.) | NOx | CO |
| 200 | 56.7 | 2.4 |
| 250 | 61.4 | 6.4 |
| 300 | 67.2 | 13.8 |
| 350 | 68.4 | 21.6 |
| 400 | 62.6 | 26.9 |

Example 6: Preparation of Extruded Honeycomb Substrate Containing Impregnated Palladium Three samples prepared according to Example 1 were impregnated with aqueous palladium nitrate similarly to the method described in Example 2 in such a way that palladium loadings of 5 g/ft$^3$, 10 g/ft$^3$ and 20 g/ft$^3$ were obtained. The resulting samples were dried and calcined.

Example 7: Sample Testing

The samples prepared according to Example 5 were tested in the same way as Example 3, except in that a space velocity of 120,000 hr$^{-1}$ was used. The results are set out in the following Tables, but are presented as kNOx and kCO instead of absolute NOx % conversion and absolute CO % conversion reported in Examples 3 and 5. The results of the control are those of the base catalyst of Example 1.

Example 8 with a flow rate such that the Gas Hourly Space Velocity (GHSV) was 120,000 hr$^{-1}$.

Example 1

| Inlet T (° C.) | SCR kNOx (m/hr) | kCO (m/hr) |
|---|---|---|
| 200 | 22.3 | 0.5 |
| 250 | 38.7 | 0.3 |
| 300 | 56.0 | 0.4 |
| 350 | 64.7 | 0.8 |
| 400 | 66.5 | 0.9 |
| 450 | 57.6 | 0.5 |

Example 7A

| Inlet T (° C.) | SCR + 5 g/ft³ Pd kNOx (m/hr) | kCO (m/hr) |
|---|---|---|
| 200 | 17.8 | 0.9 |
| 250 | 38.3 | 9.5 |
| 300 | 53.4 | 64.5 |
| 350 | 60.5 | 106.2 |
| 400 | 58.3 | 125.4 |
| 450 | 46.0 | 134.0 |

Example 7B

| Inlet T (° C.) | SCR + 10 g/ft³ Pd kNOx (m/hr) | kCO (m/hr) |
|---|---|---|
| 200 | 18.7 | 1.4 |
| 250 | 35.1 | 13.4 |
| 300 | 48.3 | 63.5 |
| 350 | 56.0 | 99.4 |
| 400 | 50.0 | 117.7 |
| 450 | 36.8 | 128.4 |

Example 7C

| Inlet T (° C.) | SCR + 20 g/ft³ Pd kNOx (m/hr) | kCO (m/hr) |
|---|---|---|
| 200 | 15.6 | 1.3 |
| 250 | 35.7 | 15.2 |
| 300 | 54.0 | 74.8 |
| 350 | 63.2 | 109.6 |
| 400 | 55.5 | 128.1 |
| 450 | 39.4 | 139.6 |

For the avoidance of any doubt, the entire contents of all documents cited herein are incorporated into the description by reference.

The invention claimed is:

1. A multi-function catalyst article for treating both $NO_x$ and carbon monoxide emissions in a flow of a combustion exhaust gas from a stationary emission source, the article comprising a honeycomb monolith substrate comprising one or more channels which are open at both ends and extend along an axial length thereof and through which, in use, a combustion exhaust gas flows, which catalyst article comprising a catalyst composition comprising a combination of a first, vanadium-containing SCR catalyst component and a second component, wherein the second component is a mixed oxide comprising manganese, magnesium, aluminium and lanthanum ($MnMgAlLaOx$).

2. The multi-function catalyst article according to claim 1, which does not comprise any precious metals.

3. The multi-function catalyst article according to claim 1, wherein the catalyst composition is impregnated with palladium as an only precious metal present in the multi-function catalyst article.

4. The multi-function catalyst article according to claim 1, wherein the catalyst composition comprises palladium as an only precious metal present in the multi-function catalyst article which has been pre-fixed onto a refractory metal oxide support material.

5. The multi-function catalyst article according to claim 3, wherein the second component is a compound of a transition metal further comprising any one or more of copper, cobalt, molybdenum, nickel or cerium.

6. The multi-function catalyst article according to claim 1, wherein the catalyst comprises a third, crystalline molecular sieve component.

7. The multi-function catalyst article according to claim 6, wherein the third, crystalline molecular sieve component is ion-exchanged with a transition metal being iron, copper, nickel, cobalt or zinc or a combination of any two or more thereof.

8. The multi-function catalyst article according to claim 7, wherein all transition metals present in second component are different from the transition metal ion-exchanged in the third, crystalline molecular sieve component.

9. The multi-function catalyst article according to claim 1, wherein the catalyst composition does not comprise a crystalline molecular sieve.

10. An exhaust system for selectively catalysing the reduction of oxides of nitrogen ($NO_x$) including nitrogen monoxide and carbon monoxide in an exhaust gas of a stationary source of combined $NO_x$ and CO emissions, which system comprising an injector for introducing a nitrogenous reductant into the exhaust gas located downstream from the oxidation catalyst; and a catalyst article according to claim 1 located downstream of the injector.

11. An exhaust system according to claim 10 comprising a heat recovery steam generator (HRSG).

12. A stationary source of $NO_x$ and carbon monoxide emissions, which is a power station, an industrial heater, a cogeneration power plant, a combined cycle power generation plant, a wood-fired boiler, a stationary diesel engine, a stationary natural gas-fired engine, a marine propulsion engine, a diesel locomotive engine, an industrial waste incinerator, a municipal waste incinerator, a chemical plant, a glass manufacturing plant, a steel manufacturing plant or a cement manufacturing plant comprising an exhaust system according to claim 10.

13. A method for treating an exhaust gas comprising $NO_x$, which optionally comprises a ratio of NO to $NO_2$ from about 4:1 to about 1:3 by volume, and carbon monoxide, which method comprising the steps of:
 (i) contacting an exhaust gas stream containing $NO_x$ and $NH_3$ with a catalyst article according to claim 1; and
 (ii) converting at least a portion of the $NO_x$ to $N_2$ and/or converting at least a portion of the CO to $CO_2$.

14. The multi-function catalyst article according to claim 7, wherein one or more transition metal in the second component is the same as the transition metal ion-exchanged in the third, crystalline molecular sieve component, wherein the quantity of the metal present in the catalyst composition is in excess of the ion-exchange capacity of the third, crystalline molecular sieve component.

\* \* \* \* \*